United States Patent [19]
Vatt et al.

[11] Patent Number: 5,363,368
[45] Date of Patent: Nov. 8, 1994

[54] SIMULTANEOUS TDMA COMMUNICATION SYSTEM

[75] Inventors: Gregory B. Vatt, Mesa, Ariz.; Raymond J. Leopold, Colorado Springs, Colo.

[73] Assignee: Motorola, Inc., Schaumburg, Ill.

[21] Appl. No.: 889,001

[22] Filed: May 26, 1992

[51] Int. Cl.⁵ ............................................. H04L 5/14
[52] U.S. Cl. ........................................ 370/24; 370/97
[58] Field of Search ...................... 370/24, 29, 30, 31, 370/32, 104.1, 97

[56] References Cited

U.S. PATENT DOCUMENTS

| 4,287,588 | 9/1981 | Segner | 370/29 |
| 4,510,595 | 4/1985 | Glance et al. | 370/30 |
| 4,644,524 | 2/1987 | Emery | 370/32 |

FOREIGN PATENT DOCUMENTS 0237972  3/1987  European Pat. Off. ...... H04B 7/185

*Primary Examiner*—Wellington Chin
*Attorney, Agent, or Firm*—Robert M. Handy; Gregory J. Gorrie

[57] ABSTRACT

A network of satellites delivers communications through bi-directional communication links between individual ones of the satellites. Each satellite terminates a plurality of links. All satellites are synchronized to recognize a constant duration frame structure. For each link in the network, satellites at both ends of the link simultaneously transmit data communications into their respective ends of the link using the same frequency band. Transmissions into all links supported by a satellite occur simultaneously. The transmissions continue for a duration that is responsive to the distance between the satellites. Transmissions cease for all links supported by a satellite when the communications from the opposing link nodes have nearly propagated the entire distances between the satellites. After ceasing transmissions, each satellite receives the communications previously transmitted from the opposing satellites into the links therebetween.

29 Claims, 7 Drawing Sheets

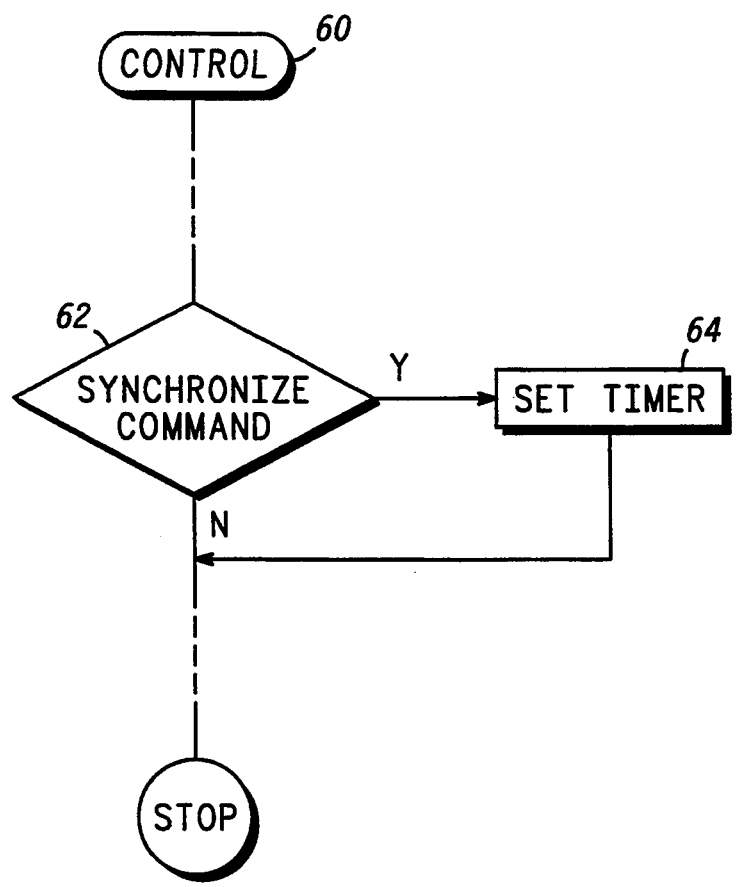
FIG. 6
FIG. 8
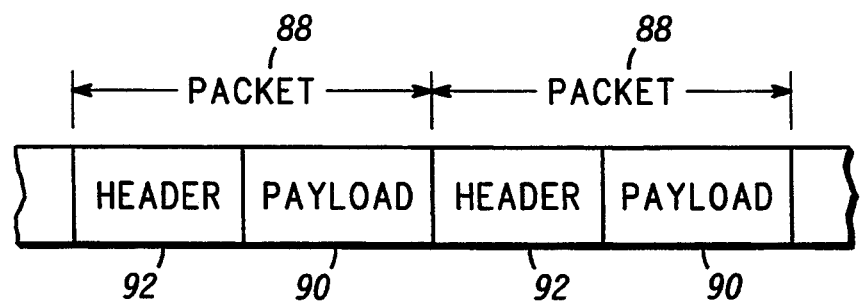

SIMULTANEOUS TDMA COMMUNICATION SYSTEM

TECHNICAL FIELD OF THE INVENTION

The present invention relates generally to communication systems. More specifically, the present invention relates to such systems which utilize time division multiple access (TDMA) techniques for engaging in bi-directional communications.

BACKGROUND OF THE INVENTION

Bi-directional communications may use communication links or channels through which signals are delivered. Such signals may be sent over wires, optical fibers, or be modulated for delivery through space in the form of RF communications or for delivery through water or air in the form of acoustic communications. Bi-directional communications address interference problems. For example, when two nodes exchange communications, each node must be able to distinguish its own transmitted signals from the signals transmitted by the other node.

Conventional bi-directional communications contemplate full duplex or half duplex operation. Full duplex operation uses two, oppositely directed, simplex or unidirectional links which operate simultaneously. No interference results because the two links operate independently from one another. For example, one link may use an entirely separate set of wires or fibers from the other link, or one link may use an entirely separate frequency band or set of frequencies from the other link. With full duplex operation, each party transmits over one link while simultaneously receiving over the other link. Half duplex operation utilizes only a single link. Communication may travel in either direction over this single link so long as it travels in only one direction at a time. Interference is avoided because nodes which utilize the link refrain from transmitting and receiving at the same time.

Full duplex operation is often preferred over half duplex operation. Assuming that a single half duplex link and the two simplex links used by a full duplex operation have the same capacity, a greater amount of data may be communicated using full duplex operation. Moreover, with full duplex operation, link management and timing concerns become trivial. On the other hand, with half duplex operation the communication system must devise schemes to determine when to allow different nodes to transmit over the link.

When RF communication links are established through space, and particularly outer space, the desirability of full duplex operation fades. For example, even though two simplex links may utilize different portions of the spectrum, transmission circuits adapted to operate in one portion of the spectrum must be isolated from receive circuits that are adapted to operate in another portion of the spectrum. This isolation is often accomplished at the cost of massive shielding and increased circuit complexity. When the node operating one end of the link is a satellite, the weight of shielding and increased circuit complexity can make satellite costs excessive.

Moreover, when a node operates more than one bi-directional link, the total number of independent spectrum bands needed to carry non-interfering communications increases. Thus, a given amount of spectrum may be divided into a greater number of closely spaced independent frequency bands. As the number of frequency bands increases, so do the isolation problems discussed above.

While conventional half duplex operation does not suffer from the isolation problems associated with full duplex operation, it has its own problems. The half duplex requirement that only one node use the link at a time results in an inefficient use of the link. Nodes may be required to wait between transmitting one communication and receiving another. The wait is imposed by the time it takes the communications to travel between nodes, and is often greater than the duration of a communication signal's round trip between the nodes. For example, a first node that has just completed a first transmission into a link must wait for a second node to finish receiving the first transmission, for the second node to begin a second transmission, and for the second transmission to reach the first node, before receiving data from the link. When nodes are located hundreds or thousands of miles apart, this wait can impose significant delays on communication. Moreover, as more nodes engage in half duplex communication among each other, the amount of data that can be delivered between any two nodes decreases.

SUMMARY OF THE INVENTION

Accordingly, it is an advantage of the present invention that an improved bi-directional communication system and method are provided.

Another advantage of the present invention is that a bi-directional communication system and method are provided which are free from the isolation problems associated with full duplex operation.

Another advantage of the present invention is that a bi-directional communication system and method are provided which reduces the inefficiencies of half duplex operation.

Another advantage of the present invention is that a bi-directional communication system and method are provided which can be implemented using simple circuit designs and which is suitable for implementation in satellites.

The above and other advantages of the present invention are carried out in one form by a method of communicating data between first and second nodes through a communication channel. The method calls for transmitting, beginning at a first point in time, first data into the channel from the first node. Beginning at substantially the first point in time, second data is transmitted into the channel from a second node. The first data is received from the channel, starting at a second point in time, at the second node. The second data is received from the channel, starting at substantially the second point in time, at the first node.

BRIEF DESCRIPTION OF THE DRAWING

A more complete understanding of the present invention may be derived by referring to the detailed description and claims when considered in connection with the Figures, wherein like reference numbers refer to similar items throughout the Figures, and:

FIG. 6 shows a flow chart of a Control procedure performed by nodes of the communication network;

FIG. 8 shows a block diagram of data communicated between nodes of the communication network.

DETAILED DESCRIPTION OF THE PREFERRED EMBODIMENTS

Figure 1:
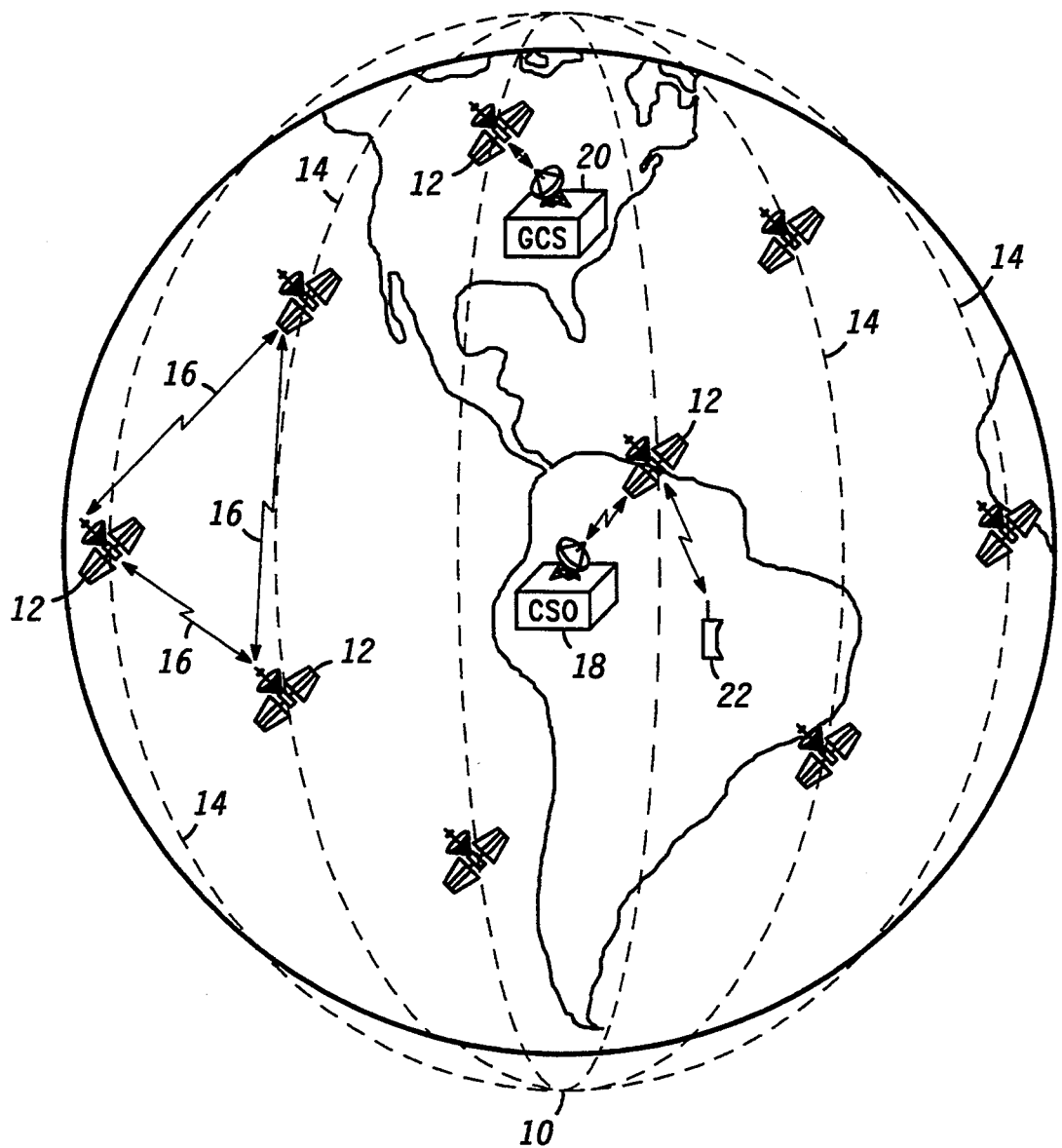
FIG. 1 shows a layout diagram of an environment within which one embodiment of the present invention is practiced.

FIG. 1 illustrates a satellite-based communication network 10. Network 10 is dispersed over the earth through the use of several above-the-earth communication nodes, such as orbiting satellites 12. In the preferred embodiment, satellites 12 occupy polar, low-earth orbits 14. In particular, the preferred embodiment of network 10 uses seven polar orbits, with each orbit holding eleven satellites 12. For clarity, FIG. 1 illustrates only a few of these satellites 12.

Orbits 14 and satellites 12 are distributed around the earth. Each orbit 14 encircles the earth at an altitude of around 765 km. Due to these low-earth orbits 14, satellites 12 travel with respect to the earth at around 25,000 km/hr. Together, satellites 12 form a constellation in which satellites 12 remain relatively stationary with respect to one another, except for their orbits converging and crossing over each other in the polar regions. In particular, each satellite 12 resides a distance of around 4000 km from its neighboring satellites 12 in the same orbital plane 14, and electromagnetic signals require approximately 13.4 msec to travel this distance. This in-plane distance and corresponding signal propagation time remain relatively constant.

Figure 2:
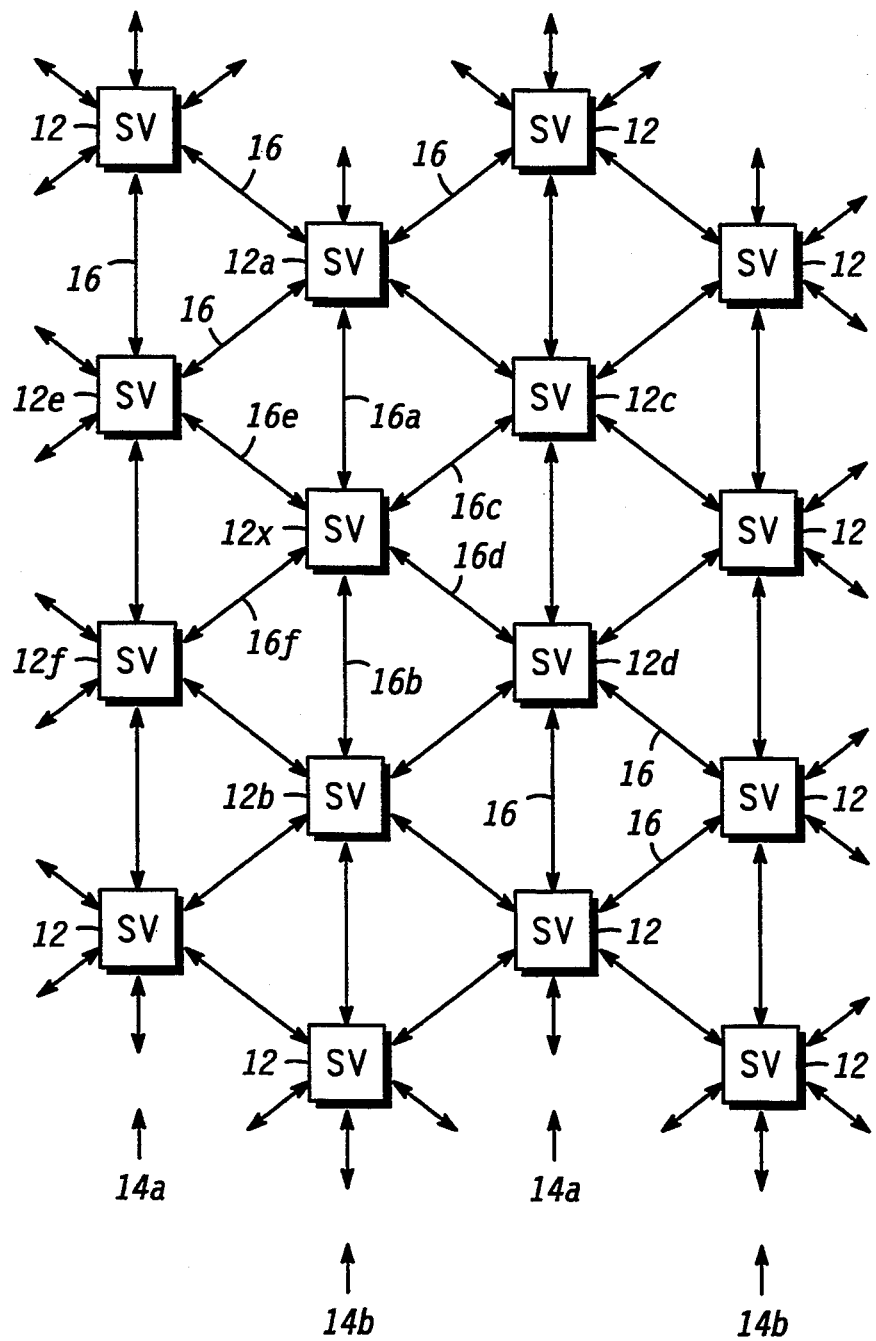
FIG. 2 shows a layout diagram of communication links between nodes of a communication network.

FIG. 2 presents a static, two dimensional map of the relative orientation of satellites 12. With reference to FIGS. 1-2, at any given instant satellites 12 in even orbital planes 14a reside at approximately the same latitudes on one side of the earth. Likewise, satellites 12 reside at approximately the same latitudes on one side of the earth for all odd planes 14b. However, odd-plane satellites 12 are positioned out-of-phase with even-plane satellites 12. At any given instant, the latitudes of odd-plane satellites 12 are approximately half way between the latitudes for nearby even-plane satellites 12.

A line-of-sight exists between each satellite 12 and fore and aft satellites 12 in the same plane 14, and fore and aft satellites 12 in adjacent planes. The preferred embodiment employs RF communications, preferably in the 20-30 GHz range, to establish communication links 16 between each satellite 12 and its neighbor satellites 12. With reference to FIG. 2, up to six line-of-sight, bi-directional, RF communication links 16 are supported for each satellite 12. As shown in FIG. 2, fore and aft links 16a and 16b exist between a satellite 12x and the preceding and following satellites 12a and 12b, respectively, orbiting in the same plane 14 (i.e. in-plane satellites). Fore-right and aft-right links 16c and 16d exist between satellite 12x and the preceding and following satellites 12c and 12d, respectively, orbiting in a right side adjacent plane 14 (i.e. cross-plane satellites).

Likewise, fore-left and aft-left links 16e and 16f exist between satellite 12x and the preceding and following satellites 12e and 12f, respectively, orbiting in a left side adjacent plane 14. Each satellite 12 illustrated in FIG. 2 supports a similar orientation of links 16. In the preferred embodiment, all of RF links 16a-16f for each satellite 12 utilize the same frequency spectrum, and all links 16a-16f transmit and receive communications over this spectrum.

With reference back to FIG. 1, the distance between satellites 12 in adjacent orbits 14 varies with latitude. The greatest distance between cross-plane satellites 12 exists at the equator. This distance decreases as satellites 12 approach the polar regions. Electromagnetic signals require between 7 and 13 msec, depending on the latitude, to travel between nearby cross-plane satellites 12.

While FIGS. 1-2 and the above-presented discussion describe a preferred orbital geometry for network 10, those skilled in the art will appreciate that the communication nodes which each satellite 12 provides need not be positioned as described herein. For example, such nodes may be located on the surface of the earth or in orbits other than those described herein. Likewise, the precise number of nodes may vary from network to network.

Satellites 12 communicate with devices on the ground through many central switching offices (CSOs) 18, of which FIG. 1 shows only one, a few ground control stations (GCSs) 20, of which FIG. 1 shows only one, and any number of radiocommunication subscriber units 22, of which one is shown in FIG. 1. Subscriber units 22 may be located anywhere on the face of the earth. CSOs 18 are preferably distributed over the surface of the earth in accordance with geo-political boundaries. GCSs 20 preferably reside in extreme northern or southern latitudes, where the convergence of orbits 14 causes a greater number of satellites 12 to come within direct line-of-sight view of a single point on the surface of the earth with respect to more equatorial latitudes. Preferably, around four GCSs 20 are used so that all satellites 12 in the constellation may at some point in their orbits 14 come within direct view of their assigned GCS 20.

Nothing prevents CSOs 18 and GCSs 20 from being located together on the ground. However, CSOs 18 serve a different function from that of GCSs 20. GCSs 20 preferably perform telemetry, tracking, and control (TT&C) functions for the constellation of satellites 12. Preferably, CSOs 18 operate as communication nodes in network 10. Diverse terrestrial-based communications systems, such as the worldwide public switched telecommunications network (not shown), may access network 10 through CSOs 18. Due to the configuration of the constellation of satellites 12, at least one of satellites 12 is within view of each point on the surface of the earth at all times. Accordingly, network 10 may establish a communication circuit through the constellation of satellites 12 between any two subscriber units 22, between any subscriber unit 22 and a CSO 18, or between any two CSOs 18.

Figure 3:
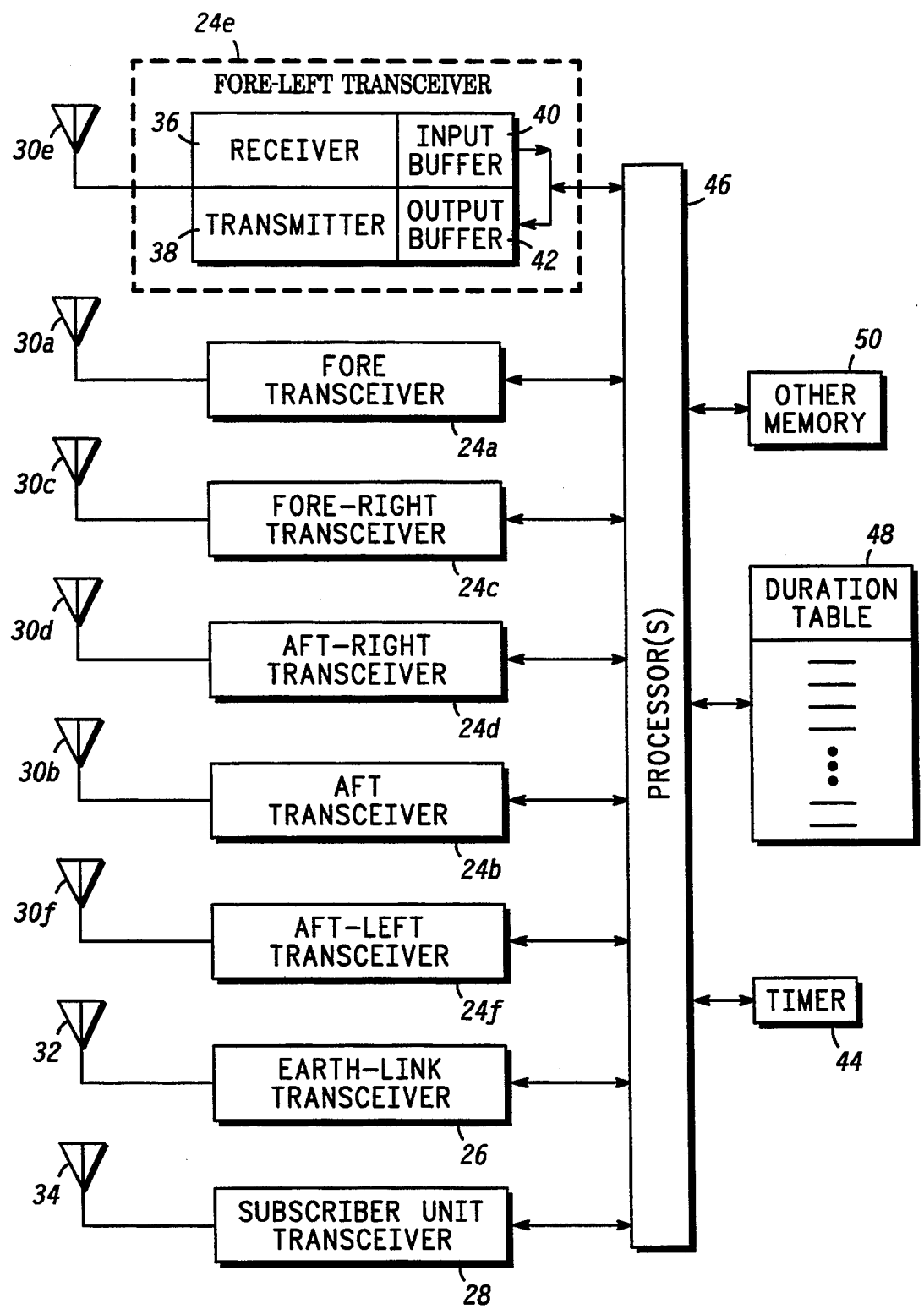
FIG. 3 shows a block diagram of a node of the communication network.

FIG. 3 shows a block diagram of a communication node, for example a satellite 12, used by network 10 (see FIG. 1). Satellite 12 includes any number of transceivers. For example, one transceiver 24 serves each link 16. Thus, transceivers 24a-24f correspond to links 16a-16f, respectively (see FIG. 2). In addition, satellite 12 includes an earth-link transceiver 26 and a subscriber-unit transceiver 28. Satellite 12 communicates with CSOs 18 and GCSs 20 (see FIG. 1) through transceiver 26, and with subscriber units 22 (see FIG. 1) through transceiver 28.

Each of transceivers 24, 26, and 28 couple to corresponding antennas 30, 32, and 34, respectively. Of antennas 30, 32, and 34, at least antennas 30a-30f are preferably directional antennas which may be oriented for maximum signal strength in the line-of-sight direction corresponding to links 16a-16f (see FIG. 2), respectively.

Each transceiver 24 may include various sub-components common in the art, as illustrated in connection with fore-left transceiver 24e. For example, each transceiver 24 may include a receiver 36 and a transmitter 38. Each receiver 36 couples to an input buffer 40, into which input data is placed after the data are received at satellite 12 and demodulated. Each transmitter 38 couples to an output buffer 42, from which data are obtained for modulation and radiation or broadcasting away from satellite 12 Desirably, all data placed in buffers 40-42 during one frame are disposed of by the end of the next frame. Thus, input buffers 40 and output buffers 42 are held to a minimal configuration.

In accordance with the preferred embodiment of the present invention, receivers 36 and transmitters 38 for each transceiver 24 operate in the same frequency band. Moreover, receivers 36 operate at different times than transmitters 38. Thus, receivers 36 and transmitters 38 may advantageously share numerous components, such as oscillators, timing circuits, and the like (not shown) to simplify satellite design. Moreover, since receivers 36 are not required to receive data while transmitters 38 are operating, a minimal amount of isolation shielding is required. The simplified satellite design, reduction in shielding, and minimal data buffering lowers satellite weight, improves reliability, and reduces costs associated with satellites 12 within network 10 (see FIG. 1).

In the preferred embodiment of the present invention, transceivers 26 and 28 need not utilize the same frequency spectrum as transceivers 24. Preferably, transceivers 26 and 28 operate at frequencies which are sufficiently removed from the spectrum of transceivers 24 so that only a minimal amount of isolation shielding is required.

Transceivers 24, 26, and 28, along with various memory components and a timer 44, couple to a processor 46. Processor 46 may be implemented using a single processor or multiple processors operated in a parallel architecture. Generally speaking, processor 46 coordinates and controls transceivers 24 so that satellite 12 receives data communications from links 16, appropriately distributes the received communications among output buffers 42, and transmits the communications back out into links 16. Data communications are also received from and transmitted to the surface of the earth via transceivers 26 and 28. Timer 44 is utilized to synchronize processor 46 and satellite 12 with timing constraints imposed by network 10 (see FIG. 1).

The memory components include a duration table 48. Table 48 associates durations with latitudes in a one to one correspondence Thus, by supplying a latitude to table 48 a duration may be obtained. In alternate embodiments, table 48 associates durations with time values, distances with latitudes, distances with time values, or the like. Regardless of the selected embodiment, by supplying a key which corresponds to a satellite's location, table 48 provides data that corresponds to the duration required for an electromagnetic signal to propagate from satellite 12 to a nearby satellite 12 along cross-plane links 16c-16f (see FIG. 2). These duration data are responsive to the distances between satellite 12 and nearby satellites 12 at the indicated latitudes. These data may directly represent the duration, or they may represent the distance which can be divided by the speed of signal propagation to produce the duration. The data used as a key may directly represent latitude or they may represent a point in time that corresponds to a particular point in the orbit of a satellite 12.

The memory components also include other memory 50. Memory 50 includes data which serve as instructions to processor 46 and which, when executed by processor 46, cause satellite 12 to carry out procedures that are discussed below. Memory 50 also includes other variables, tables, and databases that are manipulated due to the operation of satellite 12.

Figure 4:
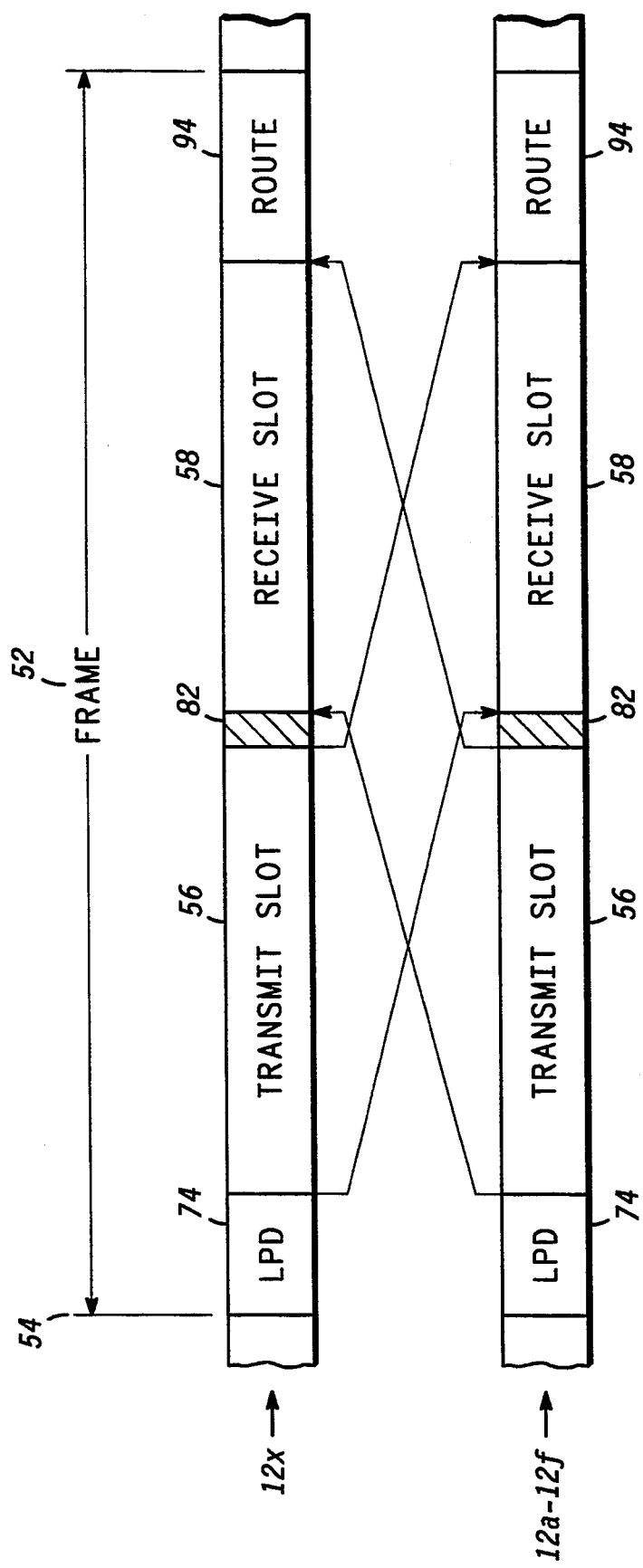
FIG. 4 shows a timing diagram depicting bi-directional communication in accordance with a first embodiment of the present invention.
Figure 5:
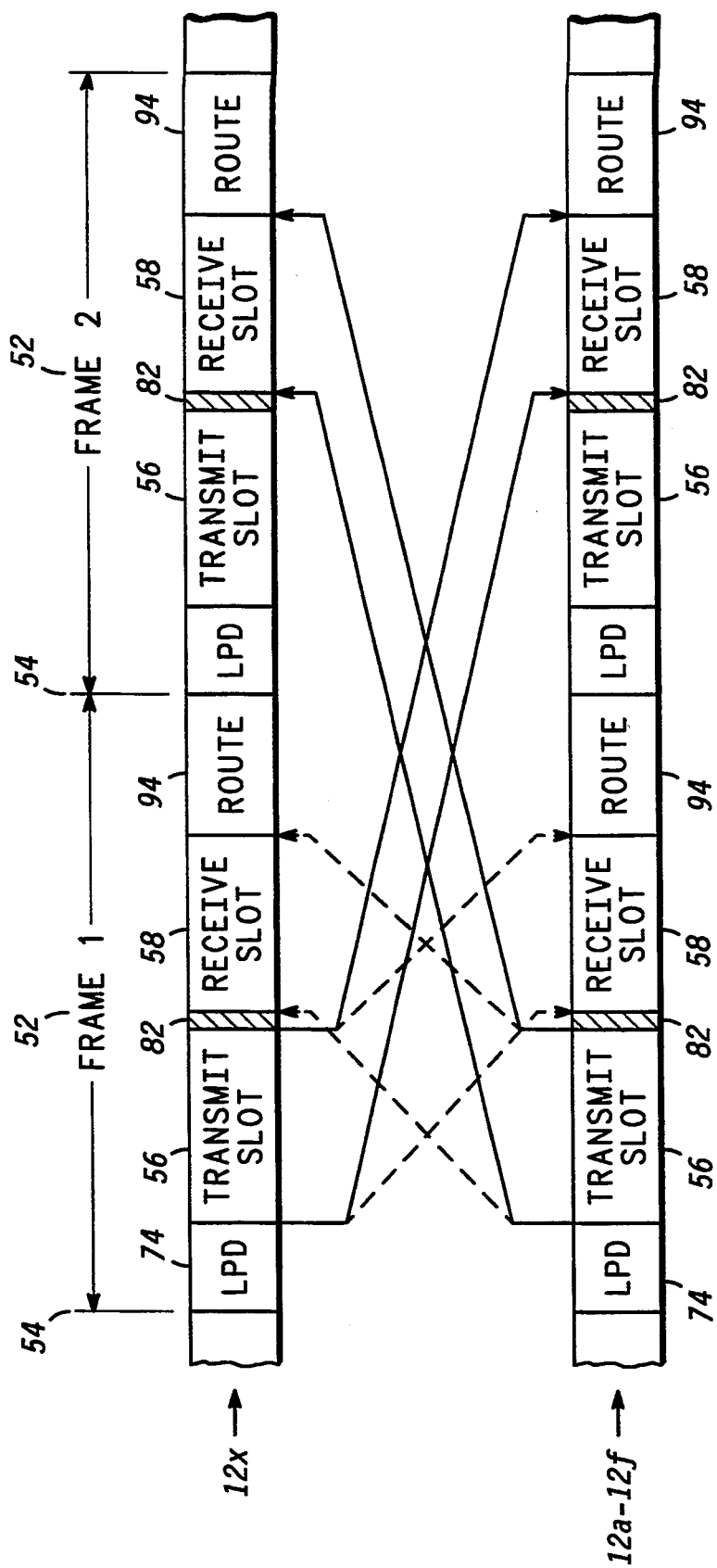
FIG. 5 shows a timing diagram depicting bi-directional communication in accordance with a second embodiment of the present invention.

FIGS. 4 and 5 show timing diagrams that illustrate bi-directional communication in accordance with the present invention. FIG. 4 depicts a first embodiment of the present invention and FIG. 5 depicts a second embodiment of the present invention. Each of FIGS. 4-5 depicts only a single link 16 (see FIGS. 1-2). Nevertheless, the timing illustrated therein applies to all links 16 within network 10 (see FIG. 1). In other words, all links 16 within network 10 operate substantially as depicted in FIGS. 4-5.

With reference to FIG. 4, two satellites 12 that are communicating with each other, such as satellite 12x and one of satellites 12a-12f (see FIG. 2), communicate using constant duration frames 52. The constant frame duration is maintained throughout network 10 to minimize the data buffering needed within satellites 12 and to simplify satellite design. The duration of frames 52 may, for example, be around 30 msec. Each frame begins at the same instant 54 for all satellites 12 within network 10.

Approximately half of each frame 52 is dedicated to transmitting data into link 16, and a different half of each frame 52 is dedicated to receiving data from link 16. Each of satellites 12a and 12b begins transmitting data communications into link 16 at substantially the same instant and continues transmitting, during a transmit slot 56, for the same duration. Due to the communications' finite speed of propagation and the distance between satellites 12, the communications require a certain duration to propagate to the other node of the link 16. In accordance with the above-discussed orbital geometry, this duration remains constant at around 13.4 msec for a link 16 between in-plane satellites 12a-12b (see FIG. 2). This duration varies between 7 and 13 msec for a link 16 between cross-plane satellites 12c-12f (see FIG. 2), depending on the latitude of the satellites 12.

Time slot 56 is configured so that transmission from each satellite 12 ceases before the signal from the opposing party to the link 16 arrives. After halting transmission, each of the nodes operate in a receive mode, and the other party's transmitted communication is received during a receive slot 58.

In the embodiment of the present invention depicted in FIG. 4, data transmitted from satellite 12x during the beginning of a frame 52 are received at satellites 12a-12f during the end of the same frame 52, and data transmitted from satellites 12a12f during the beginning of this same frame 52 are received at satellite 12x during the end of the same frame 52.

In accordance with the FIG. 5 embodiment, data transmitted from satellites 12 during the beginning of a frame 52 are received at the opposing nodes during the end of either the same frame 52 or a subsequent frame 52. The quantity of intervening frames 52 between when a communication is sent from one node and received at another node depends on the distance between the nodes. Zero or more intervening frames are interposed when propagation delays warrant. With the second embodiment, the length of frame 52 may be reduced from that discussed above in connection with the FIG. 4 embodiment, for example to around 15 msec. The reduction in frame size reduces an overall end-to-end delay of a communication propagating through network 10 in exchange for channel capacity when satellites 12 are located certain discrete distances apart.

FIG. 6 shows a flow chart of a Control procedure 60 performed by a single satellite 12. Procedure 60 causes satellite 12 to become synchronized to an external timing signal. Those skilled in the art will appreciate that, while procedure 60 is described for a single satellite 12, each of satellites 12 desirably performs substantially the same procedure. Generally speaking, Control procedure 60 is invoked when a TT&C command is received from a GCS 20 (see FIG. 1). TT&C may involve numerous diverse commands, such as orbit control commands, diagnostics commands, and programming commands, to name a few.

Such TT&C commands may additionally include a synchronizing command. When the synchronizing command is detected, as indicated at a query task 62, program control retrieves data from the synchronizing command and programs timer 44 (see FIG. 3) in response to synchronization data carried by the command, as shown in a task 64. In the preferred embodiment, satellites 12 orbit the earth once approximately every 100 minutes. Thus, they are over a GCS 20 once every 100 minutes and may synchronize their internal time to the system time for network 10 every 100 minutes. With every satellite 12 performing substantially the same procedure, the internal timers 44 of all satellites 12 recognize a given point in time at substantially the same instant. In the preferred embodiment, timers 44 for all of satellites 12 remain synchronized to within 50 microseconds of one another. After synchronization, procedure 60 may engage in other TT&C activities not related to the present invention. Due to the operation of procedure 60, all satellites 12 within network 10 recognize instant 54 (see FIGS. 4-5), denoting the beginning of a frame, at substantially the same actual point in time for all frames 52.

Figure 7:
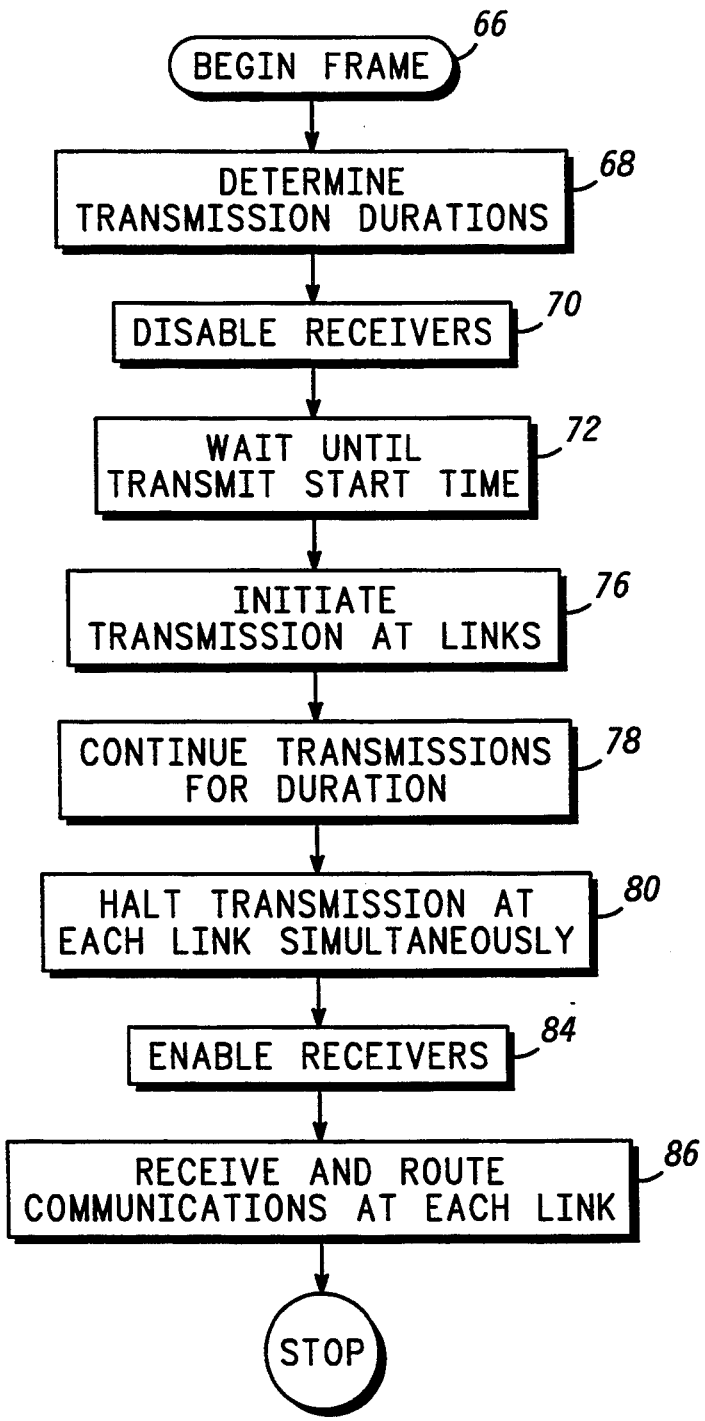
FIG. 7 shows a flow chart of a Begin Frame procedure performed by nodes of the communication network.

FIG. 7 shows a flow chart of a Begin Frame procedure 66 performed by a single satellite 12. Procedure 66 causes satellite 12 to communicate in the fashion illustrated in FIGS. 4-5. Those skilled in the art will appreciate that, while procedure 66 is described for a single satellite 12, each of satellites 12 desirably performs substantially the same procedure. Procedure 66 may be initiated in response to the beginning of each frame 52 (see FIGS. 4-5). Procedure 66 may, for example, be initiated by an interrupt supplied by timer 44 (see FIG. 3). Procedure 66 continuously repeats as a continuous stream of frames 52 are processed at satellite 12. Moreover each satellite 12 begins procedure 66 at substantially the same instant in time since all satellites 12 are synchronized, as discussed above.

Procedure 66 performs a task 68 to determine the durations for transmit slots 56 (see FIGS. 4-5). As discussed above, each transmit slot 56 lasts for a duration slightly less than the time it takes for a communication to propagate through a link 16. Since each satellite 12 supports a plurality of links 16, a plurality of durations are determined in task 68. In plane links 16a and 16b (see FIG. 2) have a substantially constant propagation delay because the satellites 12 terminating these links 16 remain a substantially constant distance apart. Thus, the corresponding durations may be obtained by retrieving a predetermined constant, for example 13.4 msec, from memory 50 (see FIG. 3).

On the other hand, the propagation delay for links 16 to satellites 12c–12f (see FIG. 2) in other orbits 14 varies as these other orbits 14 converge near the polar regions (see FIG. 1). Thus, the corresponding durations for these cross-plane links 16 may be obtained by a table look-up operation using duration table 48 (see FIG. 3). The resulting duration will represent a period of time sightly less than the distance between satellites 12 divided by the speed of propagation for a signal, which is approximately the speed of light in the preferred embodiment.

After task 68, a task 70 disables the receivers 36 of the transceivers 24 (see FIG. 3) serving the corresponding links 16a–16f (see FIG. 2). All receivers 36 of transceivers 24 are disabled in preparation for an upcoming transmit slot 56 (see FIGS. 4-5), when transmitters 38 (see FIG. 3) will be active.

After task 70, a task 72 waits, without transmitting data, until the beginning of the upcoming transmit slot 56. Task 72 is performed independently for each link 16 of satellite 12. Thus, different wait times may be used in connection with different ones of links 16a–16f. The wait times can be determined from the duration values obtained above in task 68. In the preferred embodiment, the beginning of transmit slot 56 is delayed within the half of frame 52 dedicated to transmitting data so that the first data transmitted arrives at the opposite end of a link 16 at the beginning of the receive portion of frame 52. This wait corresponds to a link path delay (LPD) 74 shown in FIGS. 4-5. The duration of LPD 74 is determined by subtracting the transmission duration from the duration of the transmission portion of frame 52.

After task 72, for each link 16 a task 76 initiates the transmission of data into the link 16. Task 76 denotes the start of transmit slot 56 (see FIGS. 4-5). After task 76, a task 78 continues transmissions for the corresponding links 16 through the duration of transmit slot 56, and a task 80 halts transmission into each link at the end of time slots 56 for the links 16. Transmission into each link 16a–16f ceases at substantially the same instant for all satellites 12. This instant should occur just prior to the beginning of receive slot 58. A transmit/receive time buffer 82 illustrated in FIGS. 4-5 is provided to compensate for any error in synchronization between the various satellites 12 of network 10.

After task 80 halts transmissions, a task 84 enables receivers 36 of transceivers 24 for the upcoming receive slot 58. Receivers 36 are operational by the end of time buffer 82 (see FIGS. 4-5), and a task 86 is performed for each link 16 supported by satellite 12 to receive any data directed thereto through the links 16. Task 86 receives data from the various links 16 and routes this data to appropriate output buffers 42 (see FIG. 3).

FIG. 8 shows a block diagram of data communicated between nodes in network 10. These data may desirably be formatted into packets 88, with each packet 88 including a header portion 92 and a payload portion 90.

Header 92 includes routing data and any other network control data which network 10 may deem useful in providing communication services. Payload portion 90 includes the data being communicated by network 10.

Referring back to FIG. 7, during task 86 processor 46 examines headers 90 to determine where to route the corresponding packets 88. After making this determination, the packets 88 are placed in the output buffers 42 (see FIG. 3) associated with those links 16 that get the packets 88 to their intended destinations. Alternatively, some of headers 90 may indicate that their corresponding packets 88 should be routed through earth-link or subscriber-unit transceivers 26 or 28, respectively, (see FIG. 3) for delivery.

Task 86 continues throughout receive slot 58 (see FIGS. 4–5). As discussed above, data were transmitted only during transmit slot 56, and slot 56 is shorter than the half of frame 52 that is dedicated to transmitting data. Consequently, receive slot 58 ends prior to the end of the half of frame 52 dedicated to receiving data and prior to the end of frame 52. A route time slot 94 remains within frame 52 after receive slot 58. Route time slot 94 may be used by processor 46 (see FIG. 3) to continue the routing of all data received during receive slot 58 (see FIGS. 4–5) in preparation for the next transmit slot 56 of the next frame 52.

After completion of task 86, program control stops or performs other tasks not related to the present invention. However, when the next frame 52 begins, process 66 repeats.

In summary, the present invention provides an improved bi-directional communication system and method. The system and method of the present invention avoids the isolation problems associated with full duplex operation because receivers are not required to operate at the same time that transmitters are operating. Moreover, the system and method of the present invention avoids the control and delay problems associated with conventional half duplex operation. Control is maintained because all satellites 12 operate synchronously in accordance with an externally supplied system time. Signal delay is minimized because both parties to a link transmit simultaneously. Thus, the links simultaneously support communications traveling in opposite directions.

Furthermore, the system and method of the present invention simplify satellite design. Little shielding is required for isolation purposes because transmitters and receivers do not operate simultaneously. Relatively little data buffering is required because constant duration frames are utilized and all data are routed through a satellite within a single frame. Moreover, many circuit components may be shared between the various transmitters and receivers utilized to support a plurality of communication links. The simplicity in satellite design reduces weight and power consumption and improves reliability, all of which lead to reduced satellite costs.

The present invention has been described above with reference to preferred embodiments. However, those skilled in the art will recognize that changes and modifications may be made in these preferred embodiments without departing from the scope of the present invention. For example, those skilled in the art will appreciate that the orbital geometry, timing, and distance values discussed herein are presented as examples only, and that the teaching of the present invention applies to network nodes which may or may not move, which may have a different geometry, and which may be characterized with different timing and distance values. These and other changes and modifications which are obvious to those skilled in the art are intended to be included within the scope of the present invention.

What is claimed is:

1. A method of communicating data between first and second nodes through a single communication channel, said first and second nodes having first and second timers, respectively, said method comprising the steps of:
   a) transmitting for a first duration, beginning at a first point first data into said single communication channel from said first node;
   b) transmitting for a second duration, beginning at substantially said first point in time, second data into said single communication channel from said second node;
   c) receiving for at least said first duration, beginning at a second point in time which occurs after said first point in time, said first data from said single communication channel at said second node; and
   d) receiving for at least said second duration, beginning at substantially said second point in time, said second data from said single communication channel at said first node, and
   e) synchronizing said first and second timers so that both of said timers indicate the occurrence of said first and second points in time at substantially the same instant.

2. A method of communicating data wherein said data are communicated between first and second nodes through a communication channel, said method comprising the steps of:
   a) transmitting for a first duration, beginning at a first point in time, first data into said channel from said node, wherein said first duration is determined by said first node;
   b) transmitting for a second duration, beginning at substantially said first point in time, second data into said channel from said second node, wherein said second duration is determined at said second node;
   c) receiving for at least said first duration, beginning at second point in time which occurs after said first point in time, said first data from said channel at said second node;
   d) receiving for at least said second duration, beginning at substantially said second point in time, said second data from said channel at said first node; and wherein:
      said nodes are spaced a distance apart from one another;
      said first duration determining step comprises the step of causing said first duration to be responsive to said distance; and
      said second duration determining step comprises the step of causing said second duration to be responsive to said distance.

3. A method of communicating data wherein said data are communicated between first and second nodes through a communication channel, said method comprising the steps of:
   a) transmitting for a first duration, beginning at first point in time, first data into said channel from said node, wherein said first duration is determined by said first node;
   b) transmitting for a second duration, beginning at substantially said first point in time, second data into said channel from said second mode, wherein said second duration is determined at said second node;

c) receiving for at least said first duration, beginning at a second point in time which occurs after said first point in time, said first data from said channel at said second node;

d) receiving for at least second duration, beginning at substantially said second point in time, said second data from said channel at said first node; and wherein:

said data propagates through said channel at a speed of propagation;

said first duration determining step comprises the step of establishing said first duration as being less than a value equal to the distance between said first and second nodes divided by said speed of propagation; and said second duration determining step comprises the step of establishing said second duration as being less than a value equal to the distance between said first and second nodes divided by said speed of propagation.

4. A method of communicating data between first and second nodes through a single communication channel, said method comprising the steps of:

a) transmitting for a first duration, beginning at first point in time, first data into said single communication channel from said first node;

b) transmitting for a second duration, beginning at substantially said first point in time, second data into said single communication channel from said second node;

c) receiving for at least said first duration, beginning at a second point in time which occurs after said first point in time, said first data from said single communication channel at said second node; and d) receiving for at least said second duration, beginning at substantially said second point in time, said second data from said single communication channel at said first node, and wherein said steps (a) through (d) define a single frame, and said method additionally comprises the steps of:

repeating said steps (a) through (d) to communicate data for a plurality of frames; and configuring said steps (a) through (d) in each frame so that said frames exhibit a substantially constant duration.

5. A method as claimed in claim 4 additionally comprising, at each of said first and second nodes, the steps of:

detecting, for each frame, a start frame which defines when said frame begins; and waiting during each frame, after said start point until said first point in time arrives before performing said steps (a) and (b).

6. A method of communicating data wherein said data are communicated between first and second nodes through a communication channel, said method comprising the steps of:

a) transmitting for a first duration, beginning at a first point in time, first data into said channel from said first node;

b) transmitting for a second duration, beginning at substantially said first point in time, second data into said channel from said node;

c) receiving for at least said first duration, beginning at second point in time which occurs after said first point in time, said first data from said channel at said second node;

d) receiving for at least said duration, beginning at substantially said second point in time, said second data from said channel at said first node;

e) receiving, beginning at a third point in time which occurs between said first and second points in time, third data from said channel at said second node;

f) receiving, beginning at substantially said third point in time, fourth data from said channel at said first node;

g) transmitting, beginning at a fourth point in time which occurs between said third and second points in time, fifth data into said channel from said first node; and h) transmitting, beginning at substantially said fourth point in time, sixth data into said channel from said second node.

7. A method of exchanging communications through a communication channel between first and second nodes, said communications propagating through said channel at a propagation speed, and said method comprising the steps of:

determining a transmission duration, said duration being less than a period of time equal to the distance between first and second nodes divided by said propagation speed;

transmitting, from each of said first and second nodes, a communication into said channel, said communications being transmitted from said first and second nodes substantially simultaneously and said communications being transmitted from said first and second nodes for said transmission duration; and receiving, at each of said first and second nodes, a communication from said channel, said receiving step occurring while said transmitting step is not being performed.

8. A method as claimed in claim 7 wherein said channel is an RF communication link, and said transmitting step comprises the step of modulating said communications so that said communications propagate through said channel from said first and second nodes in substantially a common frequency band.

9. A method as claimed in claim 7 wherein:

said first and second nodes move relative to each other;

said transmitting and receiving steps taken together begin and end with a single frame; and said method additionally comprises the step of repeating said determining, transmitting, and receiving steps so that said frames exhibit a constant duration.

10. A method as claimed in claim 7 wherein said transmitting step transmits first communications from said first and second nodes, and said method additionally comprises the steps of:

transmitting, after said receiving step, second communications into said channel from said first and second nodes, said second communications being transmitted from said first and second nodes substantially simultaneously; and receiving, at said first and second nodes after said second communications transmitting step, said first communications from said channel, said first communications receiving step occurring while said transmitting step is not being performed.

11. A method as claimed in claim 7 additionally comprising the step of sychronizing said first and second nodes so that said transmitting and receiving steps begin at substantially the same points in time.

12. A method as claimed in claim 7 additionally comprising the step of configuring said transmitting and receiving steps so that said receiving step occurs only while said transmitting step is not being performed.

13. A method of operating a node of a communications network of spaced apart nodes arranged in a predetermined operation, said method comprising the steps of:

sychronizing a timer portion of said node to an external timing signal;

transmitting a plurality of communications over a common frequency band to a corresponding plurality of said network nodes, said transmitting step being initiated in response to said timer;

receiving a plurality of communications over said frequency band from said corresponding plurality of network nodes, said receiving step being initiated in response to said timer; and avoiding performance of said transmitting and receiving steps at the same time.

14. A method as claimed in claim 13 additionally comprising the steps of:

determining durations for which to perform said transmitting step to said plurality of network nodes, said durations being responsive to distances between said one node and said plurality of said network nodes; and timing said transmitting step so that each of said communications continues for a corresponding one of said durations and so that said plurality of communications halt substantially simultaneously.

15. A method as claimed in claim 14 additionally comprising the steps of:

moving said network nodes relative to each other; and repeating said determining, transmitting, timing, and receiving steps as said one node moves so that said durations change in response in said distances.

16. A node for relaying communications within a network of spaced apart nodes arranged in a predetermined orientation, said node comprising:

a timer;

means for synchronizing said timer to an external signal;

a plurality of transmitters, each transmitter being responsive to said timer, for simultaneously transmitting during a first duration of plurality of communications over a common frequency band to a corresponding plurality of said network nodes;

a plurality of receivers, each receiver being responsive to said timer, for simultaneously receiving during a second duration a plurality of communications over said frequency band from said corresponding plurality of network nodes; and means, coupled to said transmitters and receivers, for avoiding simultaneous operation of any of said receivers during said first duration or any of said transmitters during said second durations.

17. A node as claimed in claim 16 additionally comprising:

means for determining said first and second durations for which to operate said plurality of transmitters, said first and second durations being responsive to distances between said node and said plurality of said network nodes; and means, responsive to said first and second durations determining means, for timing operation of said transmitters so that each of said plurality of communications continues for a corresponding one of said first or second durations and so that said plurality of transmitters cease operations substantially simultaneously.

18. A method of communicating in a communication system comprising two spaced apart nodes exchanging signals on substantially the same frequency comprising the steps of:

launching signals from each of the two nodes toward the other of the two nodes substantially only at the same time, said signals having predetermined durations less than a time of propagation of said signals between said nodes; and substantially simultaneously receiving the launched signals at the other of the two nodes.

19. A method of communicating in a system comprising multiple nodes having different signal propagation times therebetween, said system having a communication start time for initiating communications, said method comprising the steps of:

determining distances or propagations times separating nodes at a time when transmission therebetween is desired; and determining a variable delay from a beginning of said communication start time by which a signal to be transmitted by a transmitting node is delayed before being transmitted to a receiving node, said variable delay depending upon the distance or propagation time separating the transmitting and receiving nodes, said variable delay being adjusted so that messages transmitted by the transmitting nodes at different times are received at the receiving nodes substantially simultaneously.

20. A method of communicating data wherein said data are communicated between first and second nodes through a communication channel, said method comprising the steps of:

a) transmitting a first signal from said node toward said second node at a first time for a first duration; and b) transmitting a second signal from said second node toward said first node at said first time for a second duration;

wherein said first and second durations are less than the times required for the signals to propagate for the second node to the first node, and the first to the second node respectively.

21. A method of communicating data as claimed in claim 20 further comprising the steps of:

c) receiving at a second time said first signal at said second node for substantially said first duration; and d) receiving at substantially said second time said second signal at said first node for substantially said second duration.

22. A method of communicating data as claimed in claim 21 further comprising the step of repeating steps, a,b,c, and d on a continuous basis.

23. A method of communicating in a system having multiple nodes with different signal propagation times therebetween, comprising:

determining propagation times between various transmitting and receiving node pairs, and launching signals into a shared communication channel from the various transmitting nodes at times depending upon the propagation times separating the transmitting and receiving node of each pair so that the signals are received at the various receiving nodes substantially simultaneously.

24. The method of claim 23 wherein the propagation times separating transmitting and receiving node pairs vary with time and the determining step comprises determining propagation times separating various transmitting and receiving node pairs for one or more future times when communication is desired to occur and then carrying out the launching step at such future times.

25. A method of communication in a system having multiple nodes and a common system time, comprising the steps of, at common system times when communication between nodes is desired to occur, launching signals from originating nodes toward destination nodes, and terminating said signals before said signals reach said destination nodes, and at said common system times when communication between nodes is desired to occur, each originating node performing a step of waiting a predetermined amount of time before launching its signal, said predetermined amount of time being dependent upon the propagation time between such originating node and its corresponding destination node.

26. The method of claim 25 wherein the predetermined amounts of time are chosen so that signals launched by multiple originating nodes arrive at corresponding destination nodes at substantially the same time.

27. The method of claim 26 wherein the waiting variable times step comprises the step of choosing variable times for different transmitters such that the launched signals arrive at said receiving nodes substantially simultaneously.

28. The method of claim 26 further comprising the step of calculating the propagation times between transmitting and receiving pairs for different relative positions of the multiple nodes.

29. The method of claim 25 wherein the first energizing step comprises the step of waiting variable times before energizing the transmitters, the variable times being dependent upon predetermined propagation times between transmitting and receiving node pairs.

* * * * *

UNITED STATES PATENT AND TRADEMARK OFFICE
CERTIFICATE OF CORRECTION

PATENT NO. : 5,363,368
DATED : November 8, 1994
INVENTOR(S) : Gregory B. Vatt and Raymond J. Leopold It is certified that error appears in the above-indentified patent and that said Letters Patent is hereby corrected as shown below:

In Claim 1, column 10, line 12, after "point" insert --in time--.

In Claim 3, column 10, line 63, after "at" insert --a--.

In Claim 3, column 11, line 8, after "least" insert --said--.

In Claim 4, column 11, line 27, after "at" insert --a--.

In Claim 5, column 11, line 53, delete "frame" and insert --point--.

In Claim 6, column 12, line 2, after "at" insert --a--.

In Claim 6, column 12, line 5, after "said" insert --second--.

In Claim 7, column 12, line 28, after "between" insert --said--.

In Claim 9, column 12, line 51, delete "with" and insert --within--.

In Claim 13, column 13, line 11, delete "operation" and insert --orientation--.

In Claim 15, column 13, line 42, after "response" insert --to changes--.

In Claim 16, column 13, line 51, delete "of" and insert --a--.

UNITED STATES PATENT AND TRADEMARK OFFICE
CERTIFICATE OF CORRECTION

PATENT NO. : 5,363,368
DATED : November 8, 1994
INVENTOR(S) : Gregory B. Vatt and Raymond J. Leopold It is certified that error appears in the above-indentified patent and that said Letters Patent is hereby corrected as shown below:

In Claim 16, column 13, line 63, delete "durations" and insert —duration—.

Signed and Sealed this

Twenty-first Day of March, 1995

Attest:

BRUCE LEHMAN

Attesting Officer
Commissioner of Patents and Trademarks